US008241476B1

(12) United States Patent
Malik et al.

(10) Patent No.: US 8,241,476 B1
(45) Date of Patent: Aug. 14, 2012

(54) SOL-GEL COATINGS FOR ON-LINE PRECONCENTRATION IN CAPILLARY ELECTROPHORESIS

(75) Inventors: Abdul Malik, Tampa, FL (US); Wen Li, Tampa, FL (US); David P. Fries, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 1036 days.

(21) Appl. No.: 12/120,380

(22) Filed: May 14, 2008

Related U.S. Application Data

(63) Continuation of application No. 10/704,770, filed on Nov. 10, 2003, now Pat. No. 7,407,568.

(60) Provisional application No. 60/319,680, filed on Nov. 8, 2002.

(51) Int. Cl.
*G01N 27/453* (2006.01)

(52) U.S. Cl. ........................................ 204/605; 204/604

(58) Field of Classification Search .......... 204/601–605, 204/451–455
See application file for complete search history.

(56) References Cited

OTHER PUBLICATIONS

Guo et al. "Hydrolytically stable amino-silica glass coating material for manipulation of the electroosmotic flow in capillary electrophoresis," Journal of Chromatography A, 744 (1996) 17-29.*

Hsieh et al. "Electroosmotic flow controllable coating on a capillary surface by a sol-gel process for capillary electrophoresis," Journal of Chromatography A, 952, (2002), 255-266.*

Hayes et al. ("Sol-gel chemistry-based Ucon-coated columns for capillary electrophoresis," Journal of Chromatography B, 695 (1997) 3-13).*

* cited by examiner

*Primary Examiner* — Alex Noguerola
(74) *Attorney, Agent, or Firm* — Saliwanchik, Lloyd & Eisenschenk

(57) ABSTRACT

A novel on-line method is presented for the extraction and preconcentration of amino acids using a sol-gel coated column coupled to a conventional UV/vis detector. Extraction, stacking and focusing techniques are used in the preconcentration procedures. Sol-gel coatings are created by using N-Octadecyldimethyl[3(trimethoxysilyl)proply]ammonium chloride ($C_{18}$-TMS) in the coating sol solutions. The resulting sol-gel coating carries a positive charge. For extraction, the pH of the samples is properly adjusted to impart a net negative charge to amino acids. A long plug of the sample is then passed through the sol-gel coated capillary to facilitate extraction via electrostatic interaction between the positively charged sol-gel coating and the negatively charged amino acid molecules. The focusing of the extracted amino acids is accomplished through desorption of the extracted amino acid molecules carried out by local pH change. The described procedure provides 150,000-fold enrichment effect for alanine.

10 Claims, 11 Drawing Sheets

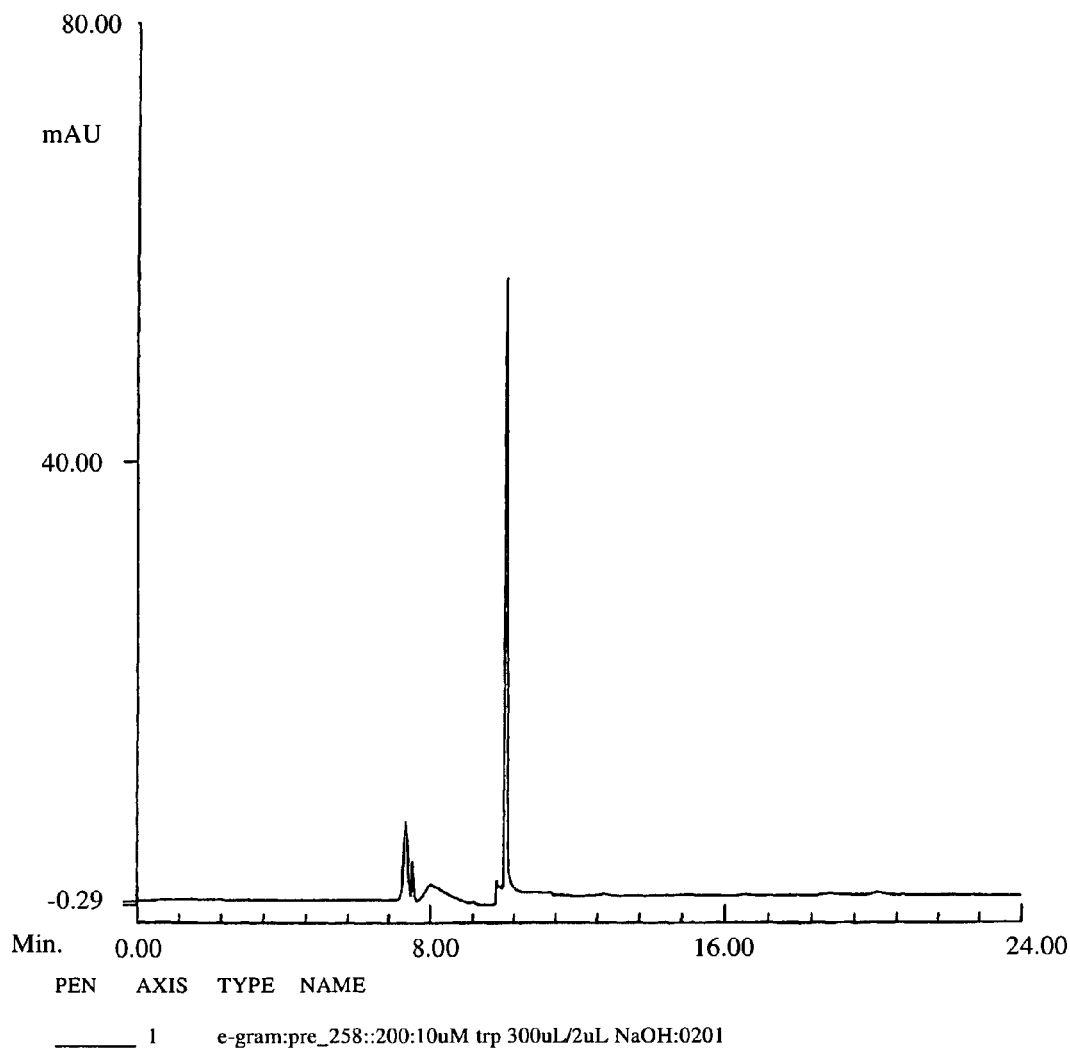

FIG. 2

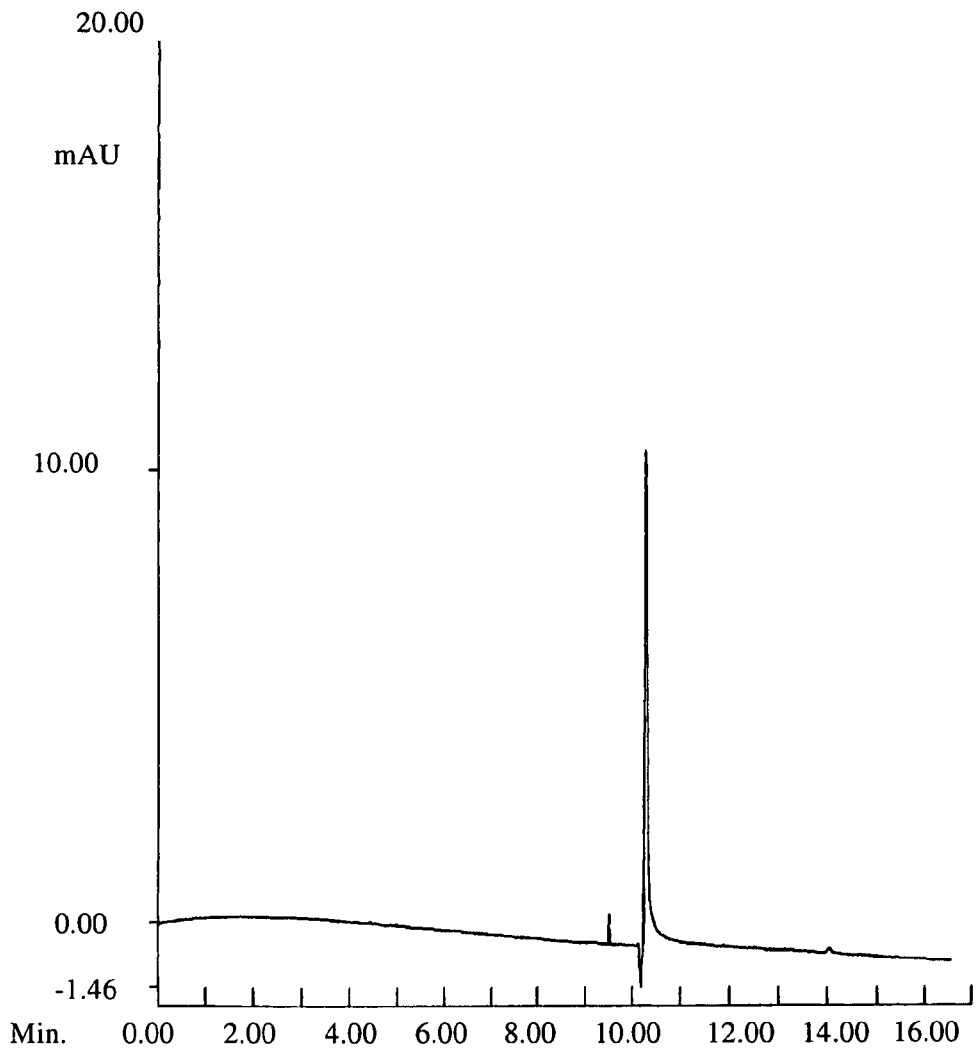

PEN    AXIS    TYPE    NAME

————— 1    e-gram:pre_104::200:10mM try:0168

Sample: 10mM try
CZE Method 1 Wed May 22 16:32:06 2002
Capillary: 75 cm x 50 um . ID: UNC-1. Uncoated. Setpoint Temp(C) : 29
Inlet: 1_R 50mM trisHCl/Base
Outlet: 1_R 50mM trisHCl/Base
Prep Cycle 1    Pre-Inject: Inlet. WATER: Outlet. Waste: 120 sec HI Pressure
Prep Cycle 2    Pre-Inject: Inlet. 1_P: Outlet. Waste: 120 sec HI Pressure
Inject: 10psi*sec    Run: 15.00 kV. Polarity: + to −
WaveLength(nm): Single 200 . Integ    200
Carousel Setpoint Temp (C) : 5
File name: C:\CE3000\MY DATA\PRE_104.BFF
Operator Name: Wen Li

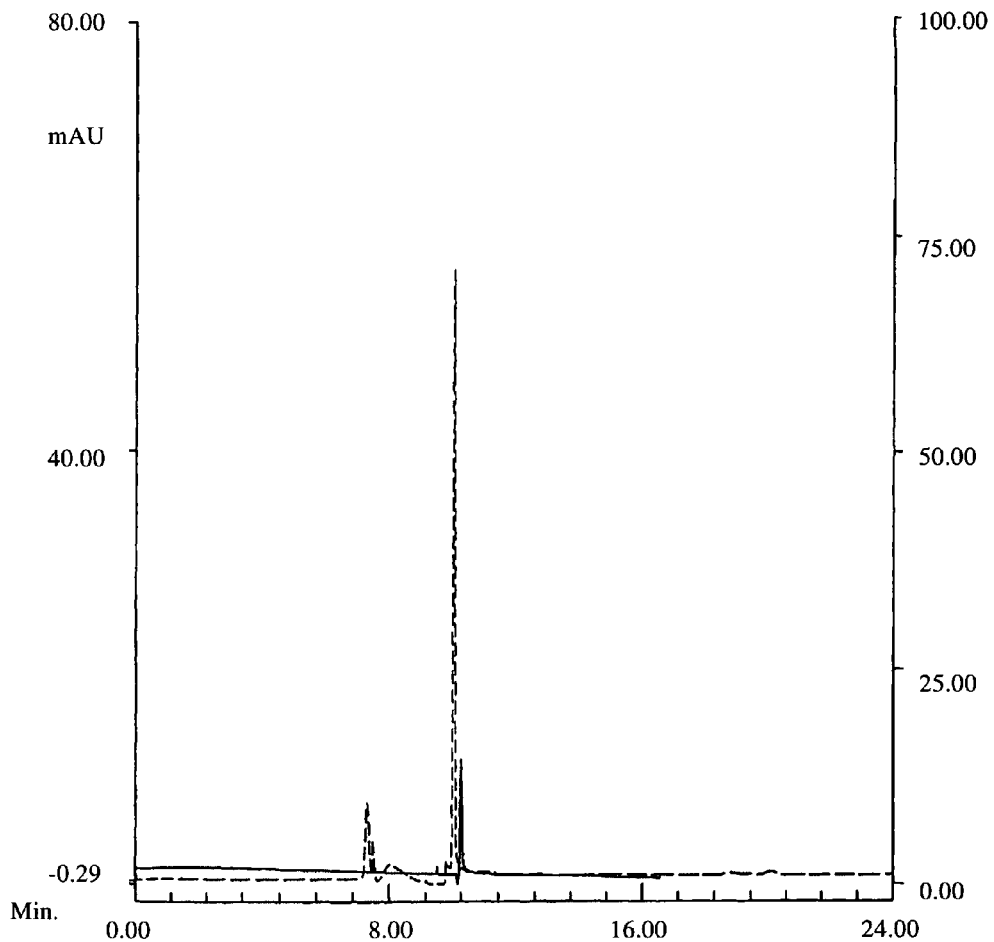

```
PEN   AXIS   TYPE   NAME
────── 1     e-gram:pre_104::200:10mM try:0168
------ 2     e-gram:pre_258::200:10uM trp 300uL/2uL NaOH:0201
```

Sample: 10mM try
CZE Method 1 Wed May 22 16:32:06 2002
Capillary: 75cm x 50 um . ID: UNC-1. Uncoated. Setpoint Temp(C) : 29
Inlet: 1_R 50mM trisHCl/Base
Prep Cycle 1     Pre-Inject: Inlet. WATER: Outlet. Waste: 120 sec HI Pressure
Prep Cycle 2     Pre-Inject: Inlet. 1_P: Outlet. Waste: 120 sec HI Pressure
Inject: 10psi*sec     Run: 15.00 kV. Polarity: + to –
WaveLength(nm): Single 200 . Integ   200
Carousel Setpoint Temp (C) :  5
File name: C\CE3000\MY DATA\PRE_104.BFF
Operator Name: Wen Li

FIG. 3

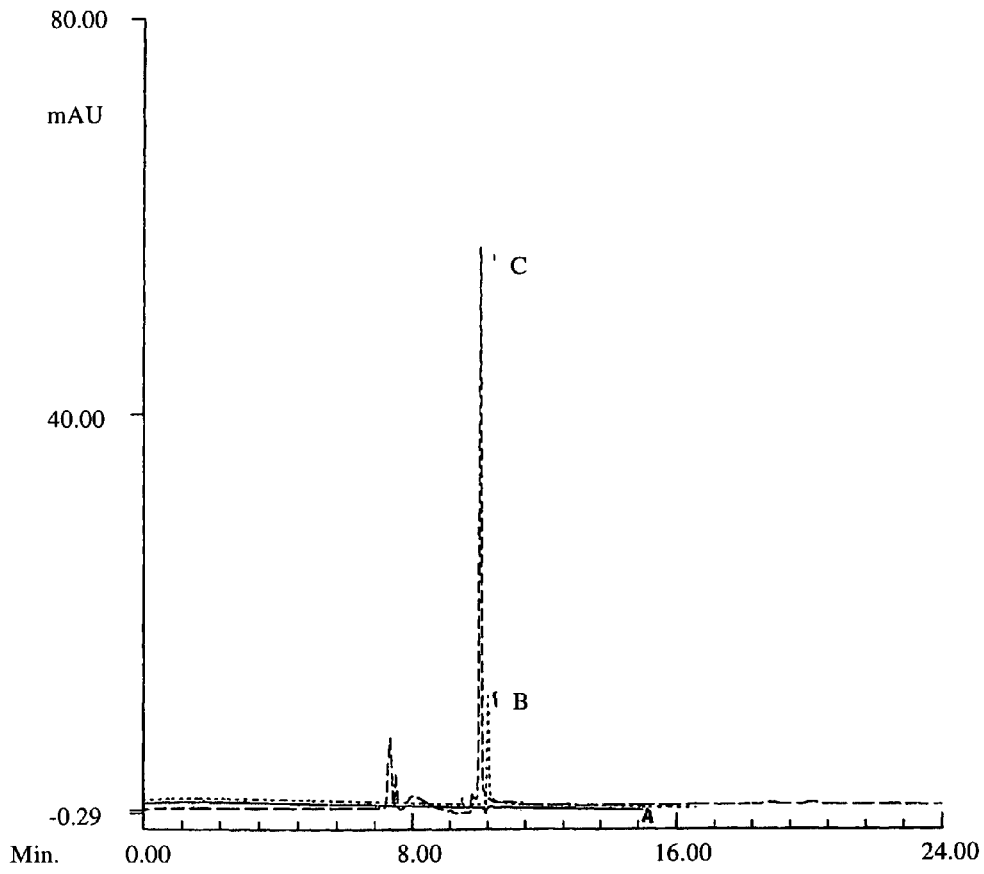

PEN AXIS TYPE NAME

A ——— 1 e-gram:pre_107::200:20uM try:0209
B --------- 1 e-gram:pre_104::200:10uM try:0168
C -- -- --- 1 e-gram:pre_258::200:10uM trp 300uL/2uL NaOH:0201

A: 20mm Tryptophan
B: 10mm Tryptophan
C: 10mm Tryptophan

Sample: 20uM try
CZE Method 1 Wed May 22 17:42:05 2002
Capillary: 75 cm x 50 um . ID: UNC-1. Uncoated. Setpoint Temp(C) : 29
Inlet: 1_R 50mM trisHCl/Base
Outlet: 1_R 50mM trisHCl/Base
Prep Cycle 1    Pre-Inject: Inlet. WATER: Outlet. Waste: 120 sec HI Pressure
Prep Cycle 2    Pre-Inject: Inlet. 1_P: Outlet. Waste: 120 sec HI Pressure
Inject: 10 psi*sec    Run: 15.00 kV. Polarity: + to –
WaveLength(nm): Single 200 . Integ 200
Carousel Setpoint Temp (C) : 5
File name: C:\CE3000\MY DATA\PRE_107.BFF
Operator Name: Wen Li

FIG. 5

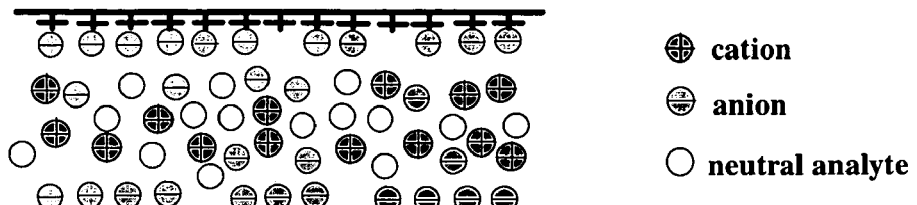
⊕ cation
⊖ anion
○ neutral analyte
1. Filling the capillary with the sample
2. Sample matrix is removed by water
⊖ Cathode
EOF →
⊕ Anode
3. Applying a high electric voltage V= -15kV
⊖ Cathode
EOF →
⊕ Anode
4. Analytes are focused by an acidic buffer
Fig. 7

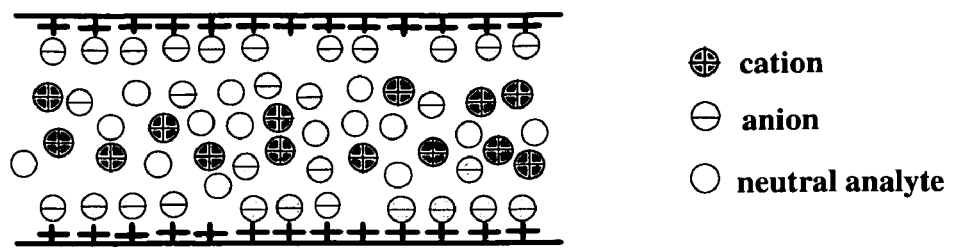
1. Filling the capillary with the sample
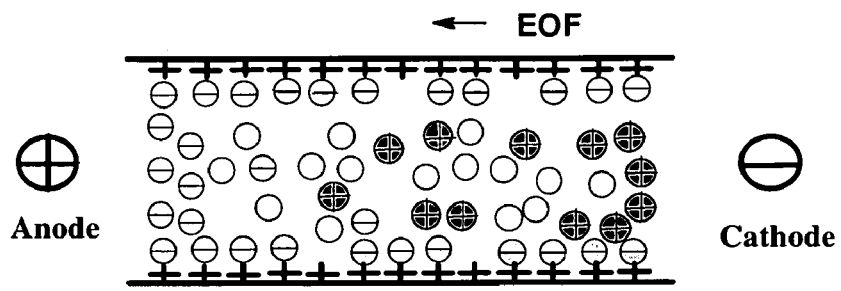
2. Applying a high electric voltage V=+15kV
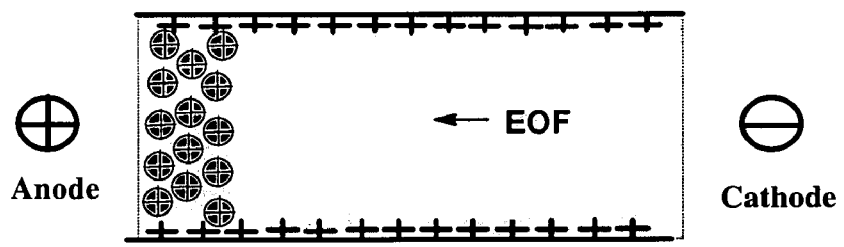
3. After a high electric voltage V=+15kV has been applied for a certain time.
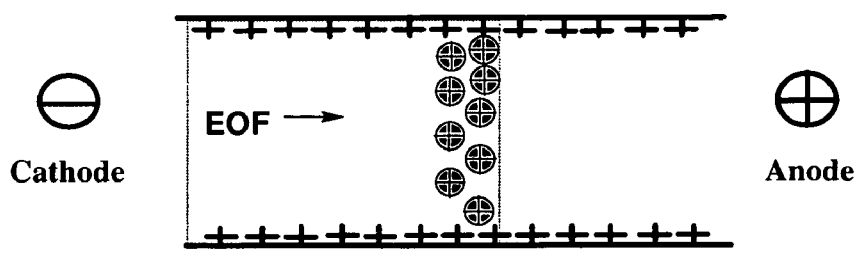
4. Switching the polarity of the high electric voltage to V=-15kV.
Fig. 9

SOL-GEL COATINGS FOR ON-LINE PRECONCENTRATION IN CAPILLARY ELECTROPHORESIS

CROSS REFERENCE TO RELATED APPLICATIONS

This application is a continuation of prior U.S. patent application Ser. No. 10/704,770, entitled "Method of Using Sol-Gel Coatings for On-Line Preconcentration of Amino Acids in Capillary Electrophoresis" filed on Nov. 10, 2003, now U.S. Pat. No. 7,407,568, which claims the benefit of priority to U.S. Provisional Patent Application 60/319,680, entitled, "Zirconia-Based Sol-Gel Stationary Phase Coatings", filed Nov. 8, 2002, the contents of which are herein incorporated by reference.

STATEMENT OF GOVERNMENT INTEREST

This invention was made with government support under Grant No. N00014-98-1-0848 awarded by the U.S. Navy. The government has certain rights in the invention.

FIELD OF INVENTION

This invention relates to pre-concentration of analytes in capillary electrophoresis. More particularly, this invention relates to pre-concentration of zwitterionic analytes in capillary electrophoresis using capillaries with sol-gel coatings.

BACKGROUND OF THE INVENTION

Sample preconcentration in capillary electrophoresis is a powerful analytical technique suitable for the analysis of biological molecules like amino acids, peptides, proteins, nucleic acids, nucleotides, etc. As a liquid-phase separation technique, capillary electrophoresis (CE) possesses a number attractive features including high efficiency, short analysis times, small sample sizes, etc. However, with UV/vis detection, which is the most common detection scheme in CE, the concentration sensitivity of the technique is usually poor. Sample preconcentration is especially important for trace analyses. Studies have been done to increase the sample concentration sensitivity in CE. Among these studies, on-line sample preconcentration methods account for a large part. Stacking is the major technique which is widely used for sample concentration in capillary zone electrophoresis (CZE). Sweeping is another important sample concentration method in CE.

CE is a type of electrophoresis, and involves resolving components in a mixture within a capillary to which an electric field is applied. The capillary used to conduct electrophoresis is filled with an electrolyte and a sample introduced into one end of the capillary using various methods such as hydrodynamic pressure, electro-osmotically-induced flow, and electrokinetic transport. The ends of the capillary are then placed in contact with an anode solution and a cathode solution and a voltage applied across the capillary. Positively charged ions are attracted towards the cathode, whereas negatively charged ions are attracted to the anode. Species with the highest mobility travel the fastest through the capillary matrix. However, the order of elution of each species, and even from which end of the capillary a species elutes, depends on its apparent mobility. Apparent mobility is the sum of a species electrophoretic mobility in the electrophoretic matrix and the mobility of the electrophoretic matrix itself relative to the capillary. The electrophoretic matrix may be mobilized by hydrodynamic pressure gradients across the capillary or by electro-osmotically-induced flow (electro-osmotic flow).

Capillary electrophoresis (CE) is a highly efficient separation technique, and possesses a number of advantageous features including high overall separation efficiency, short analysis times, and small amounts of reagents and/or samples required. CE also provides a biocompatible separation environment that is especially suitable for biological molecules including proteins, nucleic acids, peptides, nucleotides, amino acids etc. CE separations are often performed using an on-column detection mode to prevent loss of separation efficiency due to extra column band broadening that usually takes place if an off-column detection cell is used. However, in UV detection (which is the most commonly used detection technique in CE), due to the short path length (equal to the inner diameter of the column), on-column UV detection is characterized by low concentration sensitivity. A series of studies have been undertaken over the past few decades to increase the concentration sensitivity in CE. Approaches used to address this problem can be divided into three categories: (a) sample preconcentration strategies, (b) alternative capillary geometry and improved optical design, and (c) alternative detection modes. The first technique, commonly called on-line sample preconcentration, is especially attractive since it involves no additional modification of the commercially available standard CE instrument, and it can be easily accomplished by carefully controlling the operation conditions on a standard CE instrument.

Stacking is one of the most widely used techniques for sample preconcentration in capillary zone electrophoresis (CZE). In "field amplified sample stacking", the velocity of analyte ions is changed by using discontinuous buffers. When a high voltage is applied, a higher electric field is developed in the dilute sample plug than in the more concentrated running buffer because of the higher resistivity of the sample zone. The analyte ions then stack at the boundary between the sample plug and the running buffer, forming a narrow stacked zone. Discontinuous buffers can be prepared simply by addition of salts into buffer, or dissolving the sample in a low ionic strength buffer, or by adjusting their pH values. An enhancement factor of more than 100 is achieved for protein samples. For zwitterionic solutes like amino acids, peptides and proteins, discontinuity in the running buffer pH could be applied to achieve preconcentration and focusing. On-line focusing of flavin derivatives using dynamic pH junction in CE is reported to achieve a more than 1200-fold improvement in sensitivity relative to standard injection method in CE. When a large volume of sample is introduced into the separation column for stacking, the solute zone is as wide as the length of the sample plug. Several techniques have been developed to achieve a narrow stacked sample band for further analysis. Methods for stacking from a very large sample volume have been developed. First, a large volume of sample prepared in a dilute buffer is introduced into the column. A negative voltage is then applied at the capillary ends to obtain EOF directed towards the capillary inlet. Under these conditions, the sample matrix is gradually pushed out of the capillary by EOF and the anions stacked at the boundary between sample solution and the background electrolyte (BGE). The resulting sample zone is narrow, and high-efficiency separation capabilities in CE are preserved. This method is also used to determine some quaternary ammonium herbicides in spiked drinking water.

Another focusing technique in CE is capillary isoelectric focusing (CIEF). This method utilizes the differences in the isoelectric points (pIs) of analytes. The separation capillary is filled with a solution of ampholytes. If an electric field is applied across such a capillary, a pH gradient is generated along its length, and the zwitterionic analytes in the subsequently injected sample begin to migrate through the capillary under applied field. Each of the analytes will lose its net charge when it reaches the location in capillary where the pH of the ampholyte equals to the pI of the analyte. In the absence of EOF, focused discrete neutral analyte zones line up inside the capillary at locations corresponding to their pI values. CIEF is widely used for the analysis of analytes having different pI values. For example, an enhancement factor of 500 was achieved for polypeptide mixtures resulting from digestion of proteins, even though the components of the resulting mixture had very small differences in isoelectric points ($\Delta$pI~0.01).

Capillary isotachophoresis (CITP) can also be employed for sample stacking. CITP is accomplished in a capillary by injecting the sample between two discrete buffer plugs: a leading buffer with a higher mobility ion, and a terminating buffer having a lower mobility ion, than the charged analytes. When an electric field with the constant current is applied, the ions inside the sample are distributed into narrow and concentrated zones between leading and terminating buffer based on the differences in their mobilities. CITP has been used to on-line preconcentrate and separate inorganic, organic, and biomolecules.

With the development in microchip-based capillary electrophoresis, sample stacking techniques have also been used in the microfluidic CE devices. A few orders of magnitude in sample enrichment have been obtained by stacking in microchip-based CE.

The concept of sample sweeping has also been introduced. Sample sweeping is accomplished in micellar electrokinetic chromatography (MEKC), in which micelles act as a pseudo-stationary phase and "sweep" the analytes from the long injected sample plug and converts it into narrow zone(s), thereby preconcentrating the analyte(s) from the wide band of originally injected dilute sample. Sweeping makes it possible to preconcentrate neutral analytes. A million-fold sensitivity increase has been reported with a combination of stacking and sweeping effects.

A different strategy to preconcentrate neutral analytes in MEKC includes, contrary to preparing sample in a dilute, low conductivity electrolyte commonly used in sample stacking process uses a high-conductivity sample matrix, which enables the micelles to be focused before they enter the sample zone. Their method also solves the problem for the preconcentration of samples having high salt content, which is frequently met in real life situation.

The stacking of ionizable analytes in high salt sample matrix by means of transient moving chemical reaction boundary method (tMCRBM) has also been reported. Sample got stacked in the tMCRBM generated between two phases (a weak acid of the running buffer and a weak base of sample matrix). The mechanism is dependent on the zwitterionic properties of the analytes that change their net charges based on the pH. The high salt concentration in sample matrix slows down the migration velocities of analytes producing a narrow, stacked zone.

Solid-phase extraction (SPE) is another important sample preconcentration strategy. With this method, multiple column volumes of sample can be injected since the analytes are adsorbed on the stationary phase. SPE can be coupled to capillary electrophoresis system, where the preconcentrated samples get separated on the CE column. The extraction also could be accomplished by ion-exchange procedure.

What is needed is an improved method for increasing the sample concentration sensibility in CE, which should yield trace detections of analyte by UV detector, in preconcentrated samples.

SUMMARY OF INVENTION

An apparatus and associated methodology for sample pre-concentration employing electrically charged sol-gel coatings. Sol-gel columns offer many advantages over conventional columns for the separations in gas chromatography, and CE. In addition, sol-gel-coated capillaries have been employed for the extraction and preconcentration of a wide variety of polar and nonpolar analytes in solid phase microextraction (SPME) analysis. The sol-gel coatings often possess a porous structure and provide higher surface areas, which, in turn, provide efficient analyte extractions from solution. Principles of capillary microextraction with those of stacking and focusing techniques to increase the sample concentration sensibility in capillary zone electrophoresis (CZE), have been combined. On-line capillary microextraction was accomplished by using a positively charged sol-gel coating in a CZE separation column.

In a first aspect the present invention provides a sample pre-concentration system for zwitterionic analytes. The sample pre-concentration system includes a tube having an electrically-charged inner surface, a flow-generating device to pass the analyte through the tube, a capillary electrophoresis system, a first buffer solution having a pH value higher than the isoelectric point (pI) value of the zwitterionic analyte and a second buffer solution having a pH lower than the pI of the zwitterionic analyte. The electrically-charged surface of the tube can be provided by a sol-gel substrate on the tube surface. In certain embodiments, the sol-gel substrate has a positive surface charge. In alternative embodiments, the sol-gel substrate has a negative surface charge. The positively charged sol-gel substrate can be formed from a sol-gel precursor containing a quaternary amine moiety. The quaternary amine-containing sol-gel precursor can be N-octadecyl-dimethyl [3-(trimethoxysilyl)propyl]ammonium chloride. In certain embodiments the sol-gel substrate is a surface coating on the tube. In other embodiments the sol-gel substrate is a monolithic bed. The sol-gel substrate can chemically bonded to the surface of the tube. The flow-generating device can be a pump and an injector.

In a second aspect the present invention provides a sample pre-concentration kit zwitterionic analytes. The sample pre-concentration kit includes a tube having an electrically-charged interior surface, a first buffer solution having a pH value higher than the isoelectric point (pI) value of the zwitterionic analyte and a second buffer solution having a pH lower than the pI of the zwitterionic analyte. The tube is adapted for use in a capillary electrophoresis system.

In a third aspect the present invention provides a method for the preconcentration of zwitterionic analytes in a sample. The method includes the steps of adjusting the sample pH above the pI value of the zwitterionic analyte to impart a net negative charge on the zwitterionic analyte, applying the pH-adjusted sample to a tube having a positively charged sol-gel substrate on the interior surface of the tube, applying a low pH buffer to the tube, wherein the buffer has a pH value smaller than the pI of the zwitterionic analyte and sweeping the desorbed cationic analytes into a narrow zone at the front end of the low-pH buffer plug as the plug proceeds through the tube. By applying the pH-adjusted sample to a tube having a positively charged sol-gel substrate on the interior surface of the tube, the negatively-charged analytes are extracted from the sample by electrostatic attraction to the positively charged sol-gel surface as the sample passes through the tube structure. By applying a low pH buffer to the tube with the negatively-charged analytes bound to the positively charged sol-gel substrate on the interior surface of the tube, (using a buffer that has a pH value smaller than the pI of the zwitterionic analyte), a net positive charge is imparted on the zwitterionic analytes, resulting in desorption of the resulting cationic analyte from the positively charged sol-gel substrate.

In certain embodiments the method further includes the step of detecting the analyte as the pre-concentrated zone containing the analyte passes through an optical window on the tube. The method can also include the step of quantitating the analyte as the pre-concentrated zone containing the analyte passes through an optical window on the tube. The step of applying the pH-adjusted sample through a tube can be performed by applying pressure to drive the sample through the tube. The pressure can be applied using a pump or an injector. Zwitterionic analytes preconcentrated by the methodology can include amino acids, peptides, proteins and nucleotides. In certain embodiments the applying step is performed by passing a sample volume of analyte which exceeds the internal volume of the tube. This allows for the pre-concentration of a sample having a volume in excess of the volume of the tube. The low-pH buffer plug can be swept through the tube structure under the application of an electric field. The application of the electric field induces electroosmotic flow through the tube.

In a fourth aspect the present invention provides additional methods for the preconcentration of zwitterionic analytes in a sample. The method includes the steps of adjusting the sample pH below the pI value of the zwitterionic analyte to impart a net positive charge on the zwitterionic analyte, applying the pH-adjusted sample to a tube having a negatively charged sol-gel substrate on the interior surface of the tube, applying a high pH buffer to the tube, wherein the buffer has a pH value greater than the pI of the zwitterionic analyte and sweeping the desorbed anionic analytes into a narrow zone at the front end of the high-pH buffer plug as the plug proceeds through the tube. By applying the pH-adjusted sample to a tube having a negatively charged sol-gel substrate on the interior surface of the tube, the positively-charged analytes are extracted from the sample by electrostatic attraction to the negatively charged sol-gel surface as the sample passes through the tube structure. By applying a high pH buffer to the tube with the positively-charged analytes bound to the negatively charged sol-gel substrate on the interior surface of the tube, (using a buffer that has a pH value greater than the pI of the zwitterionic analyte), a net negative charge is imparted on the zwitterionic analytes resulting in desorption of the resulting anionic analyte from the negatively charged sol-gel substrate.

In certain embodiments the method further includes the step of detecting the analyte as the pre-concentrated zone containing the analyte passes through an optical window on the tube. The method can also include the step of quantitating the analyte as the pre-concentrated zone containing the analyte passes through an optical window on the tube. The step of applying the pH-adjusted sample through a tube can be performed by applying pressure to drive the sample through the tube. The pressure can be applied using a pump or an injector. Zwitterionic analytes preconcentrated by the methodology can include amino acids, peptides, proteins and nucleotides. In certain embodiments the applying step is performed by passing a sample volume of analyte which exceeds the internal volume of the tube. This allows for the pre-concentration of a sample having a volume in excess of the volume of the tube. The low-pH buffer plug can be swept through the tube structure under the application of an electric field. The application of the electric field induces electroosmotic flow through the tube.

In a fifth aspect the present invention provides a method of preparing of a sol solution coated capillary having an inner surface. The method includes the steps of filling a fused silica capillary with sol solution, wherein the sol solution comprises a sol-gel precursor, allowing the sol solution in the capillary to form a stationary phase, wherein a first portion of the stationary phase forms a thin layer, chemically bonded to the inner surface of the capillary, and a second portion of the stationary phase forms a residual solution and expelling the residual solution leaving a coated column. In certain embodiments the sol solution includes a deactivating reagent and a sol-gel catalyst. The sol-gel precursor can be N-Octadecyl-dimethyl[3-(trimethoxysilyl)propyl]ammonium chloride.

In certain embodiments the step of expelling the residual solution is performed under gas pressure. filling a fused silica capillary with sol solution, wherein the sol solution comprises a sol-gel precursor, allowing the sol solution in the capillary to form a stationary phase, wherein a first portion of the stationary phase forms a thin layer, chemically bonded to the inner surface of the capillary, and a second portion of the stationary phase forms a residual solution and expelling the residual solution leaving a coated column The method can further include the step of conditioning the coated column in an oven. The sol-gel precursor can include a moiety imparting a charge to the resulting sol-gel coating in the capillary.

BRIEF DESCRIPTION OF THE DRAWINGS

For a fuller understanding of the invention, reference should be made to the following detailed description, taken in connection with the accompanying drawings, in which:

FIG. 1 is an electropherogram of detection in a sol-gel column

FIG. 2 is an electropherogram of detection in a fused silica column.

FIG. 3 is a combination of the two electropherograms of sol-gel and fused silica columns.

FIG. 5 is an electropherogram of detection of three samples in fused silica column.

FIG. 7 illustrates the preconcentration and focusing of zwitterionic analytes on a positively charged sol-gel column.

FIG. 9 is a schematic of a method for the preconcentrations of zwitterionic analytes on the sol-gel column.

DETAILED DESCRIPTION OF THE PREFERRED EMBODIMENT

Figure 4:
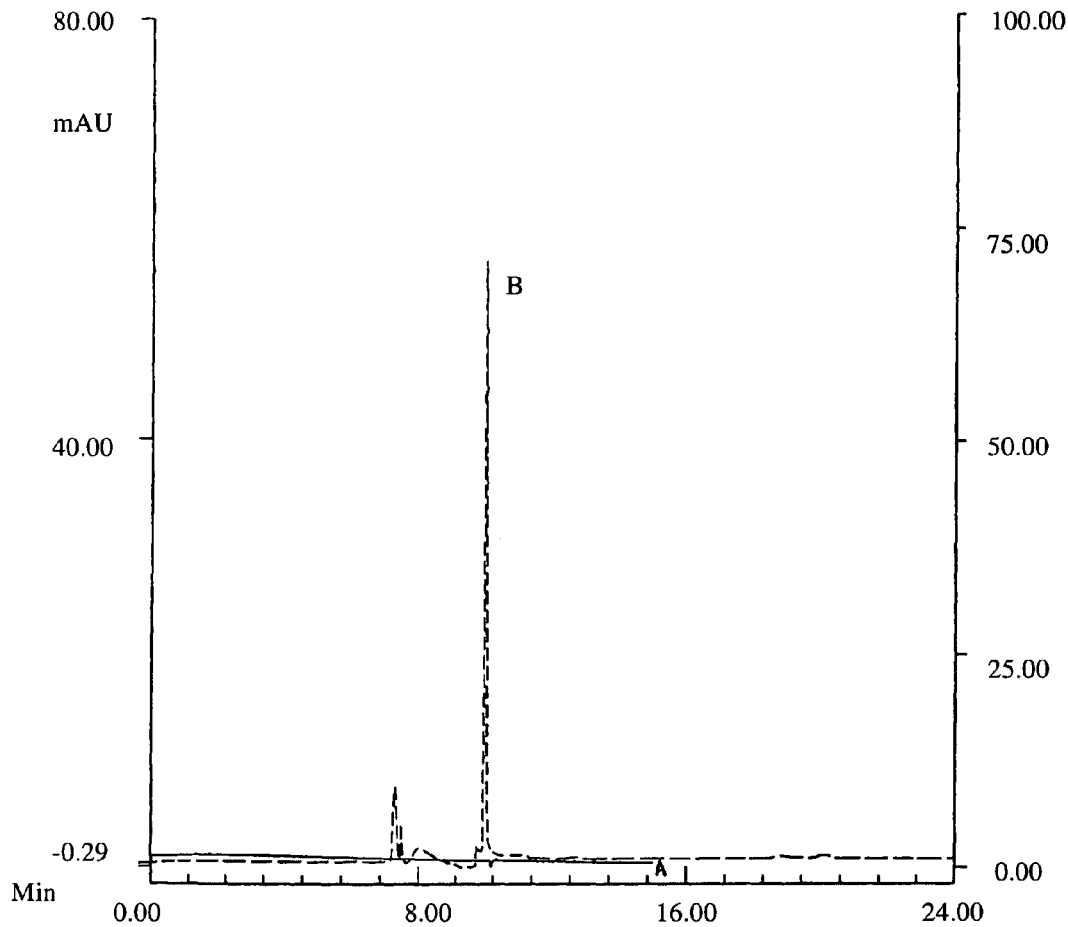
FIG. 4 is an electropherogram of detection of two samples in fused silica column.

The present invention provides a sample preconcentration technique by using a positively and negatively-charged sol-gel coating. Sol-gel columns offer many advantages over conventional columns for the separations in gas chromatography, and CE. In addition, sol-gel-coated capillaries have been employed for the extraction and preconcentration of a wide variety of polar and nonpolar analytes in solid phase microextraction (SPME) analysis. The sol-gel coatings often possess a porous structure and provide higher surface areas, which, in turn, provide efficient analyte extractions from solution. Principles of capillary microextraction with those of stacking and focusing techniques to increase the sample concentration sensibility in capillary zone electrophoresis (CZE), have been combined. On-line capillary microextraction was accomplished by using a positively charged sol-gel coating in a CZE separation column.

Sample preconcentration in CE is achieved through the use of sol-gel extraction media in the form of either surface coatings or monolithic beds. These sol-gel extraction media can be either positively charged, negatively charged or electrically neutral. A principle of the present invention is illustrated using positively charged sol-gel surface coatings in conjunction with amino acids as samples to be preconcentrated. A sample enrichment factor of over 5,000 has been achieved for phenylalanine. Similar preconcentration effects can be achieved using negatively charged or neutral sol-gel surface coatings using appropriate experimental conditions. Because of zwitterionic properties, amino acids can bear positive charge or negative charge in different pH environments. By adjusting the pH value of the buffer, the amino acids can be charged and attracted to sol-gel coating or monolithic bed carrying the opposite charge. The sol-gel coating acts as an effective extraction medium to extract the analyte from the dilute sample solutions. Next, a buffer passes through the column and sweeps the interested analyte from the sol-gel surface coating. The pH of the buffer is maneuvered so as to reverse the charge of the extracted analytes (e.g., amino acids). The desorbed samples are then stacked in discontinuous buffers. Finally, the preconcentrated samples are separated by CZE and detected by UV/vis detector.

Sample preconcentration technique by using a positively charged sol-gel coating. Sol-gel columns offer many advantages over conventional columns for the separations in GC, HPLC, and CE. In addition, sol-gel-coated capillaries have been employed for the extraction and preconcentration of a wide variety of polar and nonpolar analytes in solid phase microextraction (SPME) analysis. The sol-gel coatings often possess a porous structure and provide higher surface areas, which, in turn, provide efficient analyte extractions from solution. Principles of capillary microextraction with those of stacking and focusing techniques to increase the sample concentration sensibility in CZE have been combined. On-line capillary microextraction is accomplished by using a positively charged sol-gel coating in a CZE separation column.

Sol-gel solution may be produced by the reagents including a sol-gel precursor, such as: tetramethoxysilane (TMOS) or N-Octadecyl-dimethyl[3-(trimethoxysilyl)propyl]ammonium chloride ($C_{18}$-TMS); a deactivation reagent such as phenyldimethylsilane; and a catalyst such as trifluoroacetic acid. The methoxysilyl groups in the $C_{18}$-TMS and in TMOS are sol-gel active, and they participate in the formation of the sol-gel polymeric network through hydrolysis and polycondensation reaction. To generate positively charged coating surface, poly(diallyldimethylammonium chloride), chitosan, and cryptand-containing polysiloxane may be used. The $C_{18}$-TMS quaternary amine moiety is responsible for the positive charge on the sol-gel coating, which not only provides the basis for electrostatic interaction between sol-gel coating and analytes in samples, but also supports reversed electroosmotic flow in the CZE column. In addition, the octadecyl chain, like a pendant group, is capable of providing the chromatographic interactions.

EXAMPLE 1

Materials and Methods

All sample concentration and CZE experiments may be performed on a Bio-Rad BioFocus 3000 capillary electrophoresis system (Bio-Rad laboratories, Hercules, Calif.) equipped with programmable, multiwavelength UV/visible detector. BioFocus 3000 operating software system (version 6.00) is used to collect and process the CZE data. A Barnstead model 04741 Nanopure deionized water system (Barnstead/Thermodyne, Dubuque, Iowa) is used to prepare deionized water, ~17 MΩ. A homemade gas-pressure-operated capillary filling/purging device is used for coating the fused-silica capillary. A Microcentaur model APO 5760 centrifuge (Accurate Chemical and Scientific Corp., Westbury, N.Y.) is used for centrifugation of the sol solutions. A Fisher model G-560 Vortex Genie 2 system (Fisher Scientific, Pittsburgh, Pa.) is used for thorough mixing. A Chemcadet model 5984-50 pH meter (Cole-Palmer Instrument Co., Chicago, Ill.) equipped with a TRIS-specific pH electrode (Sigma-Aldrich, St. Louis, Mo.) is used to measure the buffer and sample pH.

Fused-silica tubing of 50-μm is purchased from Polymicro Technologies (Phoenix, Ariz.) for the preparation of sol-gel coated columns. Sample vials (600 μL), HPLC grade methylene chloride, methanol, and acetonitrile may be purchased from Fisher Scientific (Pittsburgh, Pa.). Tetramethyl orthosilicate (99+%) and trifluoroacetic acid (99%) may be purchased from Aldrich (Milwaukee, Wis.). Tris (hydroxymethyl)aminomethane hydrochloride (reagent grade) and amino acids (DL-alanine, DL-asparagine, DL-phenylanlaine, and DL-tryptophan) may be purchased from Sigma (St. Louis, Mo.). N-octadecyldimethyl[3-(trimethoxysilyl)propyl]ammonium chloride and phenyldimethylsilane may be purchased from United Chemical Technologies, Inc. (Bristol, Pa.).

Sol-gel open tubular ODS columns with positive surface charge are prepared. The sol solution is prepared by dissolving appropriate amounts of two sol-gel precursors {tetramethoxysilane (TMOS) and N-Octadecyldimethyl[3-(trimethoxysilyl)propyl] ammonium chloride ($C_{18}$-TMS)}, a deactivation reagent [phenyldimethylsilane (PheDMS)], and a sol-gel catalyst [trifluoroacetic acid (TFA) (containing 5% water)]. A one-meter long piece of a previously cleaned and hydrothermally treated fused-silica capillary is first sealed at one end using an oxyacetylene flame. The capillary is then filled with the prepared sol solution from the open side creating a pressurized gas pocket at the sealed end. The filling process is carried out using a homemade filling device operated under 40 psi helium pressure. Because of the presence of a pressurized gas pocket at the sealed end of the capillary, the inner surface in this part of the capillary remained untouched by the sol solution. After a 20-min in-capillary residence time, the filling gas pressure is released to allow the pressurized gas pocket to expel the sol solution from the capillary through its open end. The sealed end is cut open and the capillary is further purged with helium from the previously sealed end, allowing a segment of the capillary at this end to remain untouched by the sol solution. The capillary is then coated, leaving the initially sealed end an uncoated segment (~25 cm), which is used to create an optical window for on-column UV detection. This step is followed by sealing both ends of the capillary and conditioning it in a GC oven at 150° C. for 2 hours. Following thermal treatment, the sealed capillary ends are cut open. The column is purged under 40 psi helium pressure for an additional 30 min and then sequentially rinsed with 100% acetonitrile, deionized water and desired running buffer. The UV detection window is created by burning the outside polyimide coating on the undisturbed section of the capillary.

DL-alanine, DL-asparagine, DL-phenylalanine and DL-tryptophan are dissolved in deionized water to make the test samples. The pH values are adjusted by the addition of 0.1 M sodium hydroxide solution.

After installing the sol-gel coated column on the CE system, it is first filled with the running buffer by pressure. The inlet end of the column is then inserted into the sample vial. Samples are hydrodynamically injected for 3 min at 100 psi. Under these conditions, the pH of the sample solution is kept above the pI of the test amino acid to impart a net negative charge to the solute amino acid. Electrostatic interaction between the positively charged sol-gel coating and negatively charged amino acid molecules lead to their extraction on the sol-gel column. To show the extraction effect of the sol-gel coating, the sample solution is removed from the column either by purging with deionized water or by reversed electroosmotic flow. After this, the inlet end of the capillary is returned back to the buffer reservoir, and a high electric field is applied.

EXAMPLE 2

High sample enrichment factors are achieved using sample preconcentration method of Example 1. However, it might be possible to further improve this SEF, if the following is considered. Deionized water is used during the sample matrix removal step after extraction for an extended period of time. This leads to the elution, and therefore, loss of portion of the analytes extracted on the sol-gel column. To prevent this loss, the following experiment is designed. The procedure is illustrated schematically in FIG. 9. The sample is passed through the sol-gel column for an extended injection period (3 min at 100 psi). Most of the anions are extracted by the positively charged sol-gel coating. Next, a high voltage (+15 kV) is applied with anode in the inlet side and cathode in outlet end. In this stage, a number of processes occur. One of them is that the anions in sample solution migrate to anode while cations migrate toward the cathode side by electrophoretic flow. In addition, the electroosmotic flow is generated towards the capillary inlet. EOF, being significantly stronger than the electrophoreitc flow of the ions, force the sample matrix to move toward the capillary inlet and go out of the capillary from the inlet end. At the same time, because the running buffer is acidic, it elutes extracted samples from the coating and takes them towards the inlet of the column. During this process, the analyte is focused at the boundary of the sample solution and the running buffer. The current is observed carefully to decide the time when the voltage polarity needs to be reversed. While the column is filled with sample solution, the current is low due to the low conductivity of the dilute sample solution. With more and more sample matrix being pushed out of the column, more and more running buffer fills in the column, and the current is increased because of the higher conductivity of the media filling the column. Just before the current soars up quickly, the polarity of the voltage is reversed. The focused sample zone is carried by the resulting electroosmotic flow towards to the outlet of the capillary and detected by the UV/vis detector. Instead of mechanically rinsing the column with deionized water, a reversed electroosmotic flow is applied in conjunction with a low-pH buffer. This moves the liquid sample matrix from outlet to inlet of the column. Unlike the water-rinsing procedure described in Experiment 1, this method prevents the loss of analytes that have already been extracted on the sol-gel column.

Table I lists the names and structures of sol-gel solution ingredients that may be used in the present application.

TABLE I

Names and Structures of All Sol-Gel Reagents Used in the Fabrication of Columns

| Regent Function and Reagent Name | Reagent Structure |
| --- | --- |
| Sol-gel precursors: Tetramethoxysilane (TMOS) | $H_3CO-Si(OCH_3)_3$ |
| N-Octadecyl-dimethyl[3-(trimethoxysilyl)propyl] ammonium chloride ($C_{18}$-TMS) | $H_3C-(H_2C)_{17}-N^+(CH_3)_2-(CH_2)_3-Si(OCH_3)_3$ |
| Deactivation reagent: Phenyldimethylsilane (PheDMS) | $H_3C-Si(H)(CH_3)-C_6H_5$ |
| Catalyst: Trifluoroacetic acid (TFA) | $F_3C-C(=O)-OH$ |

The sol-gel co-precursor, $C_{18}$-TMS, possesses a number of important structural features. The methoxysilyl groups in the $C_{18}$-TMS and in TMOS are sol-gel active, and they participate in the formation of the sol-gel polymeric network through hydrolysis and polycondensation reaction. To generate positively charged coating surface, poly(diallyldimethylammonium chloride), chitosan, and cryptand-containing polysiloxane, have been used by different research groups. In the present application, N-Octadecyldimethyl[3-(trimethoxysilyl)propyl]ammonium chloride ($C_{18}$-TMS) is used. Its quaternary amine moiety is responsible for the positive charge on the sol-gel coating, which not only provides the basis for electrostatic interaction between sol-gel coating and analytes in samples, but also supports reversed electroosmotic flow in the CZE column. In addition, the octadecyl chain, like a pendant group, is capable of providing the chromatographic interactions.

The mechanism of extraction in CZE column with a positively charged sol-gel ODS coating is based on the electrostatic interaction. The structures of amino acid test solutes used in the current application together with their disassociation constants are shown in Table II.

TABLE II

Structures and Some Physical Properties of Analytes

| Name | Structure | pKa of α-COOH Group | pKa of α-NH$_3^+$ Group | Isoelectric point |
|---|---|---|---|---|
| Alanine | (structure) | 2.3 | 9.7 | 6.0 |
| Asparagine | (structure) | 2.0 | 8.8 | 5.4 |
| Phenylalnine | (structure) | 1.8 | 9.1 | 5.5 |
| Tryptophan | (structure) | 2.4 | 9.4 | 5.9 |

Because of their zwitterionic properties, amino acids can bear a net positive charge, a negative charge, or be electrically neutral in different pH environments. At pH values above its isoelectric point, an amino acid will possess a net negative charge. Because of the electrostatic interactions, the negatively charged species get extracted by a positively charged $C_{18}$-sol-gel coating on the inner surface of the CZE columns.

The direction and magnitude of electroosmotic flow (EOF) in the positively charged $C_{18}$-sol-gel column is determined by two competing factors: (a) anodic EOF generated from the positively charged $C_{18}$-sol-gel coating and (b) the cathodic EOF resulting from the deprotonated residual silanol groups. In the present application, EOF in all the $C_{18}$-sol-gel columns is characterized by the neutral marker, DMSO. The $C_{18}$-sol-gel columns generate a strong anodic EOF. In addition, the $C_{18}$-sol-gel coated inner surface of the fused-silica capillary possesses a roughened texture, responsible enhanced surface area and a favorable environment for solute-stationary phase interaction.

Unlike sweeping of the analytes from the dilute sample solutions by employing micelles, the present application uses an acidic buffer to elute the extracted amino acid analytes from the sol-gel surface coating and collect them in the form of a compressed zone. This is accomplished in free solution CE, without requiring any micellar solution.

Based on reported stacking and sweeping methods, the maximum volume of the sample that could be injected into the CE system is the volume of the column itself. In the case of very dilute samples, even such a sample volume may not be enough to enrich detectable amount of the analyte after pre-concentration. In the sample preconcentration technique described in this work, the sample volume that can be used for analyte enrichment is not limited to one column volume. It allows for the injection of multiple column volumes of sample. By continuously passing the sample solution for an extended period through the sol-gel coated capillary with enhanced surface area and appropriate surface charge, the analytes can be extracted from a large volume of the sample. The pH of the sample solution should be carefully chosen, so that the zwitterionic analyte of interest assumes a net electric charge which is opposite to the surface charge on the sol-gel coated column. The extracted analytes can be further focused into a narrow band by manipulating the buffer pH.

FIG. 1 is the electropherogram of 10 uM tryptophan by a C-18 coated sol-gel column by a lengthy injection time. FIG. 2 is the electropherogram of 10 mM tryptophan analyzed by a fused silica column with normal injection. FIG. 3 is the combination of these two electropherograms under the same scale. FIG. 4 is also the electropherogram of 20 mM tryptophan analyzed by a fused silica column. It is clearly shown that the sample concentration sensitivity is enhanced greatly when analyzed in sol-gel column (FIG. 1).

Figure 6:
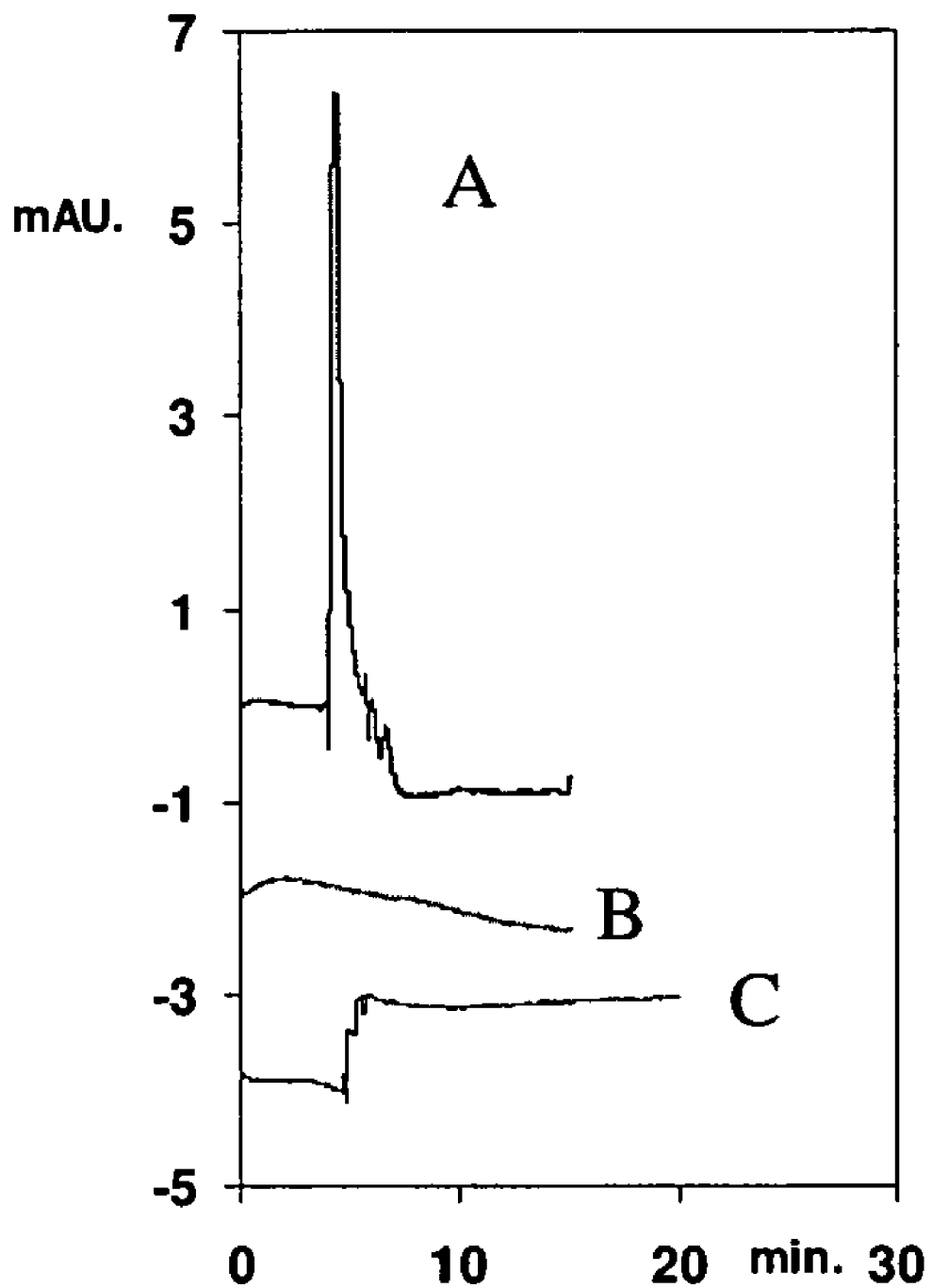
FIG. 6 is an electropherogram of the enrichment of tryptophan sample through extraction by sol-gel coating and post-extraction focusing of the extracted analytes.
Figure 8A:
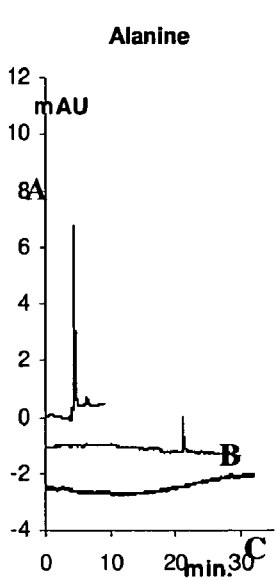
FIG. 8a-8d are the electropherograms for four amino acids preconcentrated from a 10 µM solution by a positively charged sol-gel column using an extended injection time (3 min) of experiment 1.
Figure 8C:
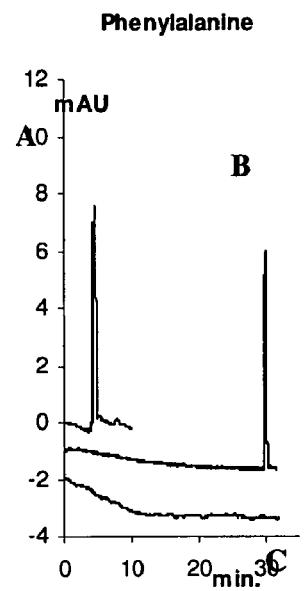
Figure 8B:
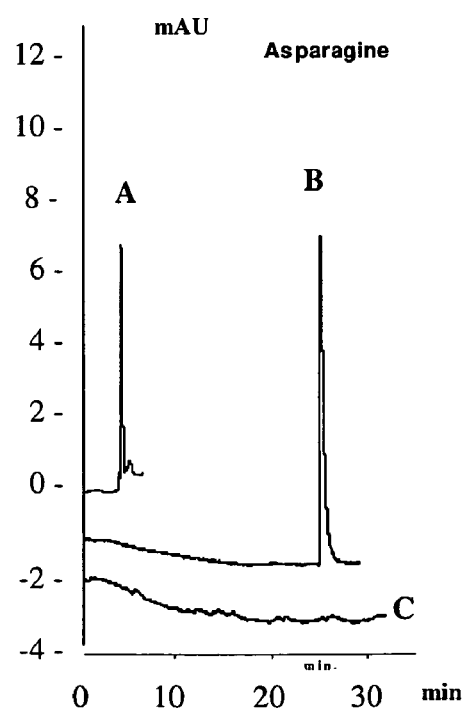
Figure 8D:
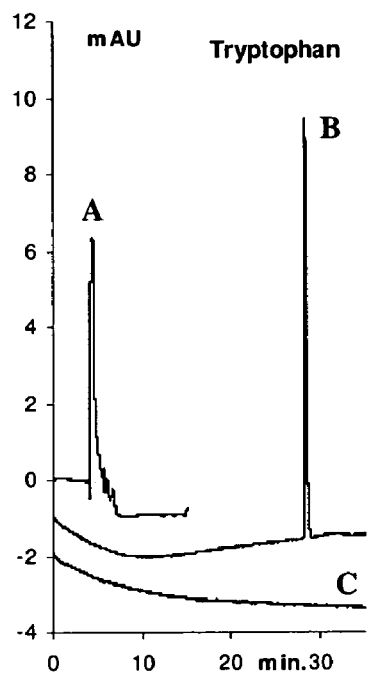
Figure 10A:
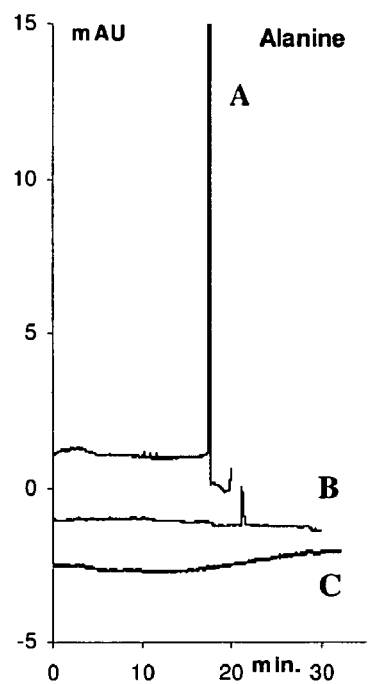
FIG. 10a-10d are the electropherograms showing the sample preconcentration results of experiment 2.
Figure 10C:
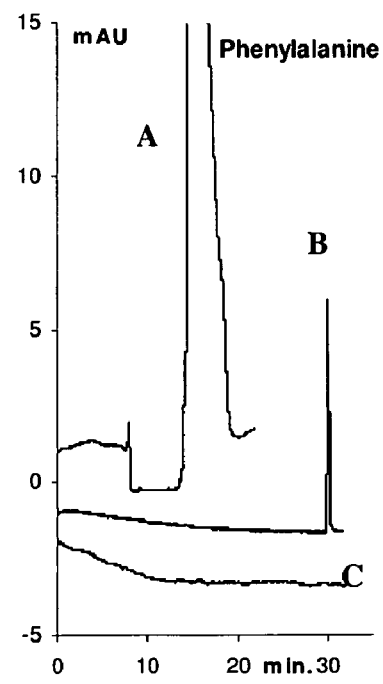
Figure 10B:
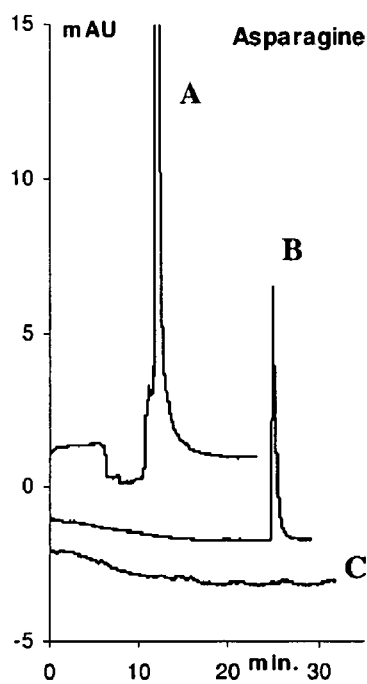
Figure 10D:
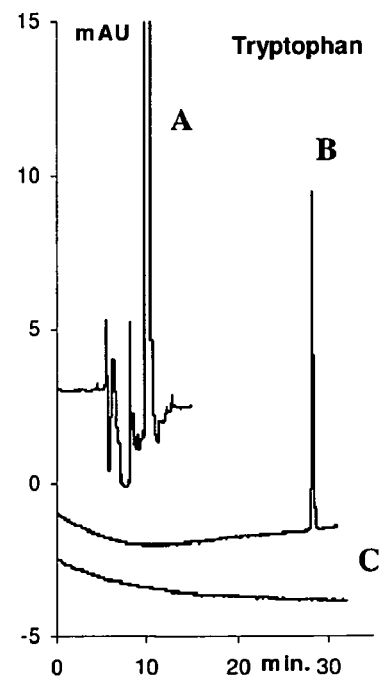

FIG. 6 shows the enrichment of the tryptophan sample (pI=5.9) through extraction by the sol-gel coating and post-extraction focusing of the extracted analytes. After an extended period of sample injection (3 min), the sample matrix is pushed out of the column by a flow of deionized water (A) or the running buffer (B). After this, a high voltage is applied and CZE is performed using an acidic buffer (50 mM Tris-HCl, pH=2.22). No sample peak could be detected, if a voltage is applied after rinsing the column with the low-pH buffer (FIG. 6B) capable of washing the extracted analytes off the sol-gel coating. On the other hand, when the sample matrix is removed by deionized water (pH=7) (FIG. 6A), the extracted amino acid molecules remained attached to the positively charged capillary surface due to electrostatic attractive forces between negatively charged solute ions and the positively charged capillary surface. Desorption of the extracted amino acid and its focusing into a narrow zone was accomplished by using a high electric field (V=−15 kV) and a low pH buffer, as illustrated in FIG. 7. The whole procedure consists of three steps: (a) extraction, (b) removal of the sample matrix and (c) desorption and enrichment of the extracted analyte using a low pH running buffer and a high electric field. In the first step, the column is filled with sample solution. Negatively charged analytes are extracted on the positively charged inner surface of the sol-gel column. This process is followed by the removal of sample matrix by deionized water. In the third step, a high negative voltage (−15 kV) is applied between the ends of the sol-gel capillary, using pH=2.22 tris buffer (50 mM) as the running background electrolyte. The cathode is on the inlet side and anode on the outlet side. Under the effect of electric field, an anodic EOF was generated in the CZE capillary with positively charged sol-gel coating. Once the acidic running buffer (50 mM Tris HCl pH=2.22) comes into contact with the front of the extracted solute zone, it reverses the net charge of the amino acid molecules providing a repulsive mechanism for their desorption from the capillary surface. EOF moves the desorbed analyte molecules forward, gradually desorbing more and more amino acid molecules and focusing them into a narrow zone.

FIG. 8(a, b, c, d) shows the electropherograms for four amino acids preconcentrated from a 10 μM solution by a positively charged sol-gel column using an extended injection time (3 min). In order to show the enrichment effect, two samples of the same amino acid at two different concentration levels are analyzed on an uncoated fused silica column with the identical dimensions using conventional injections. One of the samples has exactly the same concentration as the one used in the preconcentration experiment, and the other sample had at least 1000-fold higher concentrations of the amino acids than the preconcentrated ones. From FIG. 8, it is evident that the sample is greatly preconcentrated when analyzed on a sol-gel column. For example, the sol-gel column preconcentrated a 10 μM tryptophan sample and gives a peak height of more than 6 mAU in FIG. 8d (A). While with the uncoated column and with conventional mode of hydrodynamic injection, no peak is obtained for 10 μM tryptophan in FIG. 8d (C). Using the uncoated capillary, a tryptophan sample of 1000 times higher concentration (10 mM) is also run. As a result, a peak with a little more than 10 mAU in height is obtained shown in FIG. 8d (B). Based on these results, the limit of detection values (LOD, S/N=3) are calculated and the results are listed in Table III.

TABLE III

Sample Extraction and Preconcentrations Effect

| Sample | A* Concentration μM | A* LOD nM (S/N = 3) | B** Concentration μM | B** LOD nM (S/N = 3) | C** Concentration μM | C** LOD, nM (S/N = 3) |
|---|---|---|---|---|---|---|
| Alanine | 10 | 139 | 100 | 10,170 | 10 | N/A |
| Asparagine | 10 | 98 | 50 | 864 | 10 | N/A |
| Phenylalanine | 10 | 141 | 10 | 195 | 10 | N/A |
| Tryptophan | 10 | 115 | 10 | 203 | 10 | N/A |

*A: column (75 cm × 50 μm) with a positively charged sol-gel coating, the effective length of the column is 70.4 cm; mobile phase 50 mM Tris-HCl (pH = 2.22). Samples had been injected hydronamically for 180 seconds at 100 psi. Running voltage V = −15 kV. Wavelength of UV detector: 200 nm.
**B and C: uncoated column (75 cm × 50 μm), the effective length of the column is 70.4 cm; mobile phase 50 mM Tris-HCl (pH = 2.3). Samples had been injected hydronamically for 10 sec*psi. Running voltage V = +15 kV. Wavelength of UV detector: 200 nm.

In the $C_{18}$-sol-gel coated column and the present preconcentration method, the LODs of these amino acids are lowered significantly. The most effective preconcentration result is obtained for sample alanine. Its limit of detection value (S/D=3) is reduced from 10.2 mM on an uncoated column to 139 nM on the sol-gel coated column with the preconcentration method, which corresponds to an enrichment factor of more than 73,000 times.

In order to calculate the sensitivity enhancement factor (SEF), peak areas as well as the peak heights are employed, using the following equation.

$$SEF = \frac{\text{peak parameter obtained with preconcentration}}{\text{peak parameter obtained without preconcentration}} \times \text{dilution factor}$$

The sensitivity enhancement factors (SEF) for each analyte are presented in Table IV.

TABLE IV

Sensitivity Enhancement Factors Obtained by $C_{18}$-Sol-Gel Coated Columns* Using Amino Acids as Test Solutes*

| Sample | SEF Example 1 By Height | SEF Example 1 By Area | SEF Example 2 By Height | SEF Example 2 By Area |
|---|---|---|---|---|
| Alanine | 55,374 | 61,048 | 153,770 | 66,782 |
| Asparagine | 3,596 | 1,817 | 16,773 | 21,427 |
| Phenylalanine | 995 | 1,730 | 11,248 | 63,469 |
| Tryptophan | 928 | 1,496 | 6,326 | 10,754 |

*Operation conditions are as same as shown in FIG. 8 and FIG. 10.

The SEF values are different with respect to different samples. In addition, the observation that the migration time of the sample running in an uncoated column is much longer than that obtained in sol-gel coated column, is due to the different electroosmotic flow in coated and uncoated columns. When a low-pH acidic buffer is used as the mobile phase in an uncoated column, a significant portion of the deprotonated silanol groups on the fused silica surface get protonated by the acidic mobile phase, resulting in a decreased of EOF. Based on the experiment with a neutral marker, DMSO, when the pH value of the running buffer was 2.22, the electroosmotic mobility in the untreated fused silica column is $1.02 \times 10^{-4}$ cm$^2$/V·s. On the other hand, an acidic running buffer practically did not influence the positive charge on the sol-gel surface of the column. This is explained by the fact that dissociation of the quaternary amine group anchored to the surface coating practically remains unaffected by this pH change. Based on the result of the neutral marker, DMSO, the electroosmotic mobility obtained on the sol-gel coated column using the same buffer is reserved and has a value of $4.02 \times 10^{-4}$ cm$^2$/V·s., which is about four times greater than the EOF in the uncoated column under identical operating conditions.

The sample preconcentration results obtained by this method are shown in FIG. 10(a, b, c and d). The results show that with this method, (hereafter referred as Experiment 2), the sample preconcentration effect is more significant even compared with the results obtained by the method we described in the previous section (hereafter referred as Experiment 1). This indicates that in the Experiment 1, when the sample matrix is removed by water, some analytes are eluted by the water. However, with Experiment 2, the sample matrix is pushed out of the capillary by the reversed electroosmotic flow. The amount of lost analytes is greatly reduced.

Figure 11:
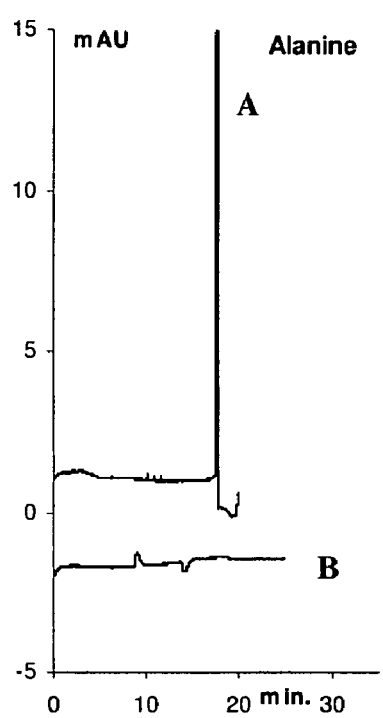
FIG. 11 is the electropherogram of a comparison between alanine and a blank sample.

FIG. 11 represents experimental data showing the preconcentration of alanine by Experiment 2 (trace A) which is compared with the blank run (trace B). This experiment is designed to verify whether the peaks obtained by the described preconcentration Experiments are artifacts of system peaks. The absence of such a peak in the blank run clearly indicates that the peak in FIG. 11 (trace A) is not a system peak, and confirms the real possibility of performing sample preconcentration using the described methods.

Figure 12:
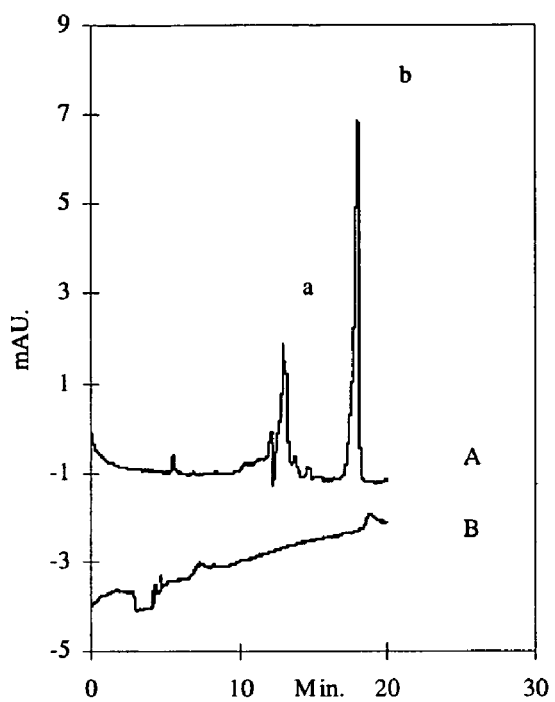
FIG. 12 is the electropherogram of the effect of sol-gel column on an amino acid mixture sample preconcentration by method 2.

Unlike Experiment 1 (which includes extraction and focusing operations only), Experiment 2 includes an additional step allowing electrophoretic migration of the extracted charged analytes. This provides a real opportunity to achieve separation of the extracted analytes by Experiment 2. FIG. 12 highlights this point and illustrates the practical utility of Experiment 2 by providing an example of on-line preconcentration and separation of two amino acids: tryptophan and asparagine. As can be seen in FIG. 12, the two preconcentrated amino acids are more than baseline separated with a wide gap between them.

The limit of detection (LOD, S/N=3) by Experiment 2 is calculated and listed in the following Table V.

TABLE V

| | Sample Extraction and Preconcentration Effect | | | | | |
|---|---|---|---|---|---|---|
| Sample | A* Concentration μM | A* LOD, nM (S/N = 3) | B** Concentration μM | B** LOD, nM (S/N = 3) | C** Concentration μM | C** LOD, nM (S/N = 3) |
| Alanine | 10 | 60.7 | 100 | 10,170 | 10 | N/A |
| Asparagine | 10 | 47.3 | 50 | 864 | 10 | N/A |
| Phenylalanine | 10 | 23.3 | 10 | 195 | 10 | N/A |
| Tryptophan | 10 | 24.5 | 10 | 203 | 10 | N/A |

*A: column (75 cm × 50 μm) with a positively charged sol-gel coating, the effective length of the column is 70.4 cm; mobile phase 50 mM Tris-HCl (pH = 2.22). Samples had been injected hydronamically for 180 seconds at 100 psi. Running voltage V = −15 kV. Wavelength of UV detector: 200 nm.
**B and C: uncoated column (75 cm × 50 μm), the effective length of the column is 70.4 cm; mobile phase 50 mM Tris-HCl (pH = 2.22). Samples had been injected hydronamically for 10 sec*psi. Running voltage V = +15 kV. Wavelength of UV detector: 200 nm.

Comparing the data listed in Table III and Table V, the limit of detection (LOD, S/N=3) for the same concentration samples are greatly reduced with Example 2. With tryptophan as the test sample, Example 2 allows lower LOD to 24.5 nM from 115 nM that is achieved by Example 1. The enhancement in sensitivity is more than five times. Compared with the results obtained from a bare fused silica column, the sensitivity enhancement factor are calculated and shown in Table IV. It is shown that the best results for both preconcentration methods belong to the same amino acid, alanine. This can be explained from its smaller size compared with other amino acid samples. According to Beer-Lambert Law, the amount of absorbed light is proportional to the product of sample concentration and its molar absorptivity coefficient. Since the inner surface area of the column is constant, the smaller the analyte, the more amino acids can be extracted on the same area of the sol-gel column. After they are desorbed from the column, the smaller molecule possesses a higher concentration. From Table IV, two important points are noted. (a) Both methods greatly increased the detection sensitivity, and (b) Example 2 is more effective compared with Example 1 because it reduces the sample loss during the sample matrix removal step.

The reproducibility of the sample preconcentration methods are examined by a series of experiments and shown in the terms of the relative standard deviation (RSD) of migration time and peak height. Table VI shows the experimental and calculation results. Good repeatability in migration times are obtained with both preconcentration methods for all test analytes. The RSD values in terms of migration time are no more than 3.7%. The RSD values in the range of 3.8% 28% are obtained for peak height repeatability. The presented data reveals that in both cases, Example 2 provided significantly better repeatability than Example 1. The sample matrix removal procedure in Example 1 probably caused the inferior reproducibility for some solutes in that method.

Sol-gel columns offer many advantages over conventional columns for the separations in GC, HPLC, and CE. In addition, sol-gel-coated capillaries are employed for the extraction and preconcentration of a wide variety of polar and nonpolar analytes in solid phase microextraction (SPME) analysis. Some examples of analytes include alanine, asparagines, phenylalnnine, and tryptophan. The sol-gel coatings often possess a porous structure and provide higher surface areas, which, in turn, provide efficient analyte extractions from solution. Principles of capillary microextraction with those of stacking and focusing techniques have been combined to increase the sample concentration sensibility in CZE. On-line capillary microextraction was accomplished by using a positively charged sol-gel coating in a CZE separation column.

On-column extraction and preconcentration effect offered by positively charged sol-gel column in capillary zone electrophoresis is achieved in this method. Using a positively charged sol-gel coating, a 150,000 fold enrichment effect was obtained for alanine. The newly developed methods do not limit the volume of the injected sample and they do not require modification of a standard CE system to achieve the preconcentration effect. They allow large-volume injection of the sample for an extended period of time, and are very effective in enriching trace concentrations of zwitterionic solutes. Large sensitivity enhancement factor (SEF) on the order of $10^5$ was obtained in the experiment. Further sensitivity enhancement should be possible in a number of ways by (a) performing the preconcentration step without the removal of sample buffer; (b) using thicker sol-gel coatings or monolithic beds; and (c) derivatizating the amino acids with proper derivatization reagents.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:
1. A sample pre-concentration system for zwitterionic analytes comprising:
a tube having an electrically-charged inner surface;
a flow-generating device to pass the analyte through the tube;
a capillary electrophoresis system;
a zwitterionic analyte of interest;

a first buffer solution having a pH value higher than the isoelectric point (pI) value of the zwitterionic analyte; and a second buffer solution having a pH lower than the pI of the zwitterionic analyte.

2. The sample pre-concentration system of claim 1 wherein the electrically-charged surface of the tube is provided by a sol-gel substrate on the tube surface.

3. The sample pre-concentration system of claim 2 wherein the sol-gel substrate has a positive surface charge.

4. The sample pre-concentration system of claim 3 wherein the positively charged sol-gel substrate is formed from a sol-gel precursor containing a quaternary amine moiety.

5. The sample pre-concentration system of claim 4 where the quaternary amine-containing sol-gel precursor is N-octadecyl-dimethyl [3-(trimethoxysilyl)propyl]ammonium chloride.

6. The sample pre-concentration system of claim 2 wherein the sol-gel substrate is chemically bonded to the surface of the tube.

7. The sample pre-concentration system of claim 6 where the sol-gel substrate has a negative surface charge.

8. The sample pre-concentration system of claim 2 wherein the sol-gel substrate is a surface coating on the tube.

9. The sample pre-concentration system of claim 1 wherein the flow-generating device is selected from the group consisting of a pump and an injector.

10. A sample pre-concentration kit for zwitterionic analytes comprising:

a tube having an electrically-charged interior surface, the tube adapted for use in a capillary electrophoresis system;

a zwitterionic analyte of interest;

a first buffer solution having a pH value higher than the isoelectric point (pI) value of the zwitterionic analyte; and a second buffer solution having a pH lower than the pI of the zwitterionic analyte.

* * * * *

UNITED STATES PATENT AND TRADEMARK OFFICE
CERTIFICATE OF CORRECTION

| | | |
|---|---|---|
| PATENT NO. | : 8,241,476 B1 | Page 1 of 1 |
| APPLICATION NO. | : 12/120380 | |
| DATED | : August 14, 2012 | |
| INVENTOR(S) | : Abdul Malik et al. | |

It is certified that error appears in the above-identified patent and that said Letters Patent is hereby corrected as shown below:

Column 1,
Lines 37-38, "number attractive" should read --number of attractive--.

Column 6,
Line 18, "pressure. filling" should read --pressure, filling--.
Line 25, "column The" should read --column. The--.

Column 9,
Line 64, "towards to the outlet" should read --towards the outlet--.

Column 15,
Line 52, "factor are" should read --factors are--.

Column 16,
Line 8, "range of 3.8% 28%" should read --range of 3.8% - 28%--.
Line 21, "phenylalnine" should read --phenylalanine--.

Signed and Sealed this
Sixth Day of November, 2012

David J. Kappos
*Director of the United States Patent and Trademark Office*